United States Patent
Gibbs et al.

(10) Patent No.: US 7,173,672 B2
(45) Date of Patent: Feb. 6, 2007

(54) SYSTEM AND METHOD FOR TRANSITIONING BETWEEN REAL IMAGES AND VIRTUAL IMAGES

(75) Inventors: Simon Gibbs, San Jose, CA (US); Michael Hoch, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 496 days.

(21) Appl. No.: 10/215,577

(22) Filed: Aug. 8, 2002

(65) Prior Publication Data
US 2003/0030734 A1 Feb. 13, 2003

Related U.S. Application Data

(60) Provisional application No. 60/311,477, filed on Aug. 10, 2001.

(51) Int. Cl.
*H04N 9/74* (2006.01)
(52) U.S. Cl. ............... 348/589; 348/586; 345/632; 345/633
(58) Field of Classification Search ........... 348/584, 348/585, 586, 589, 598, 600, 578, 722; 463/43, 463/42; 345/629, 630, 632, 633
See application file for complete search history.

(56) References Cited

U.S. PATENT DOCUMENTS

| | | | |
|---|---|---|---|
| 4,716,458 A | 12/1987 | Heitzman et al. | |
| 4,970,666 A | 11/1990 | Welsh et al. | |
| 5,398,075 A | 3/1995 | Freytag et al. | |
| 5,457,370 A | 10/1995 | Edwards | |
| 5,577,188 A | 11/1996 | Zhu | |
| 5,600,368 A | 2/1997 | Matthews et al. | |
| 5,673,401 A | 9/1997 | Volk et al. | |
| 5,689,442 A | 11/1997 | Swanson et al. | |
| 5,729,471 A | 3/1998 | Jain et al. | |
| 5,742,521 A | 4/1998 | Ellenby et al. | |
| 5,745,126 A | 4/1998 | Jain et al. | |
| 5,838,310 A | 11/1998 | Uya | |
| 5,860,862 A | 1/1999 | Junkin | |
| 5,878,174 A | 3/1999 | Stewart et al. | |
| 5,900,868 A | 5/1999 | Duhault et al. | |
| 5,966,132 A | 10/1999 | Kakizawa et al. | |
| 6,031,545 A | 2/2000 | Ellenby et al. | |
| 6,044,397 A | 3/2000 | Eleftheriadis et al. | |
| 6,067,653 A | 5/2000 | Tsukagoshi | |
| 6,072,504 A | 6/2000 | Segen | |
| 6,080,063 A * | 6/2000 | Khosla | 463/42 |
| 6,124,862 A | 9/2000 | Boyken et al. | |
| 6,133,962 A | 10/2000 | Proehl et al. | |
| 6,147,716 A | 11/2000 | Ohki | |

(Continued)

FOREIGN PATENT DOCUMENTS

WO WO 00/67867 * 11/2000

*Primary Examiner*—Michael H. Lee
(74) *Attorney, Agent, or Firm*—Blakely, Sokoloff, Taylor & Zafman, LLP (57) ABSTRACT

The invention illustrates a system and method of blending a virtual scene and a real scene comprising: capturing a real image of a real event from a real camera; receiving an instrumentation data based on the real event; and rendering a virtual image wherein the virtual image is based on the instrumentation data and the real image.

14 Claims, 9 Drawing Sheets

U.S. PATENT DOCUMENTS

| | | |
|---|---|---|
| 6,151,009 A | 11/2000 | Kanade et al. |
| 6,175,343 B1 | 1/2001 | Mitchell et al. |
| 6,178,007 B1 | 1/2001 | Harrington |
| 6,193,610 B1 | 2/2001 | Junkin |
| 6,219,011 B1 | 4/2001 | Aloni et al. |
| 6,266,100 B1 * | 7/2001 | Gloudemans et al. ....... 348/587 |
| 6,282,317 B1 | 8/2001 | Luo et al. |
| 6,295,115 B1 | 9/2001 | Zhang et al. |
| 6,330,486 B1 | 12/2001 | Padula |
| 6,359,585 B1 | 3/2002 | Bechman et al. |
| 6,380,933 B1 * | 4/2002 | Sharir et al. ................ 345/419 |
| 6,384,871 B1 | 5/2002 | Wilf et al. |
| 6,408,257 B1 | 6/2002 | Harrington et al. |
| 6,414,696 B1 | 7/2002 | Ellenby et al. |
| 6,445,815 B1 | 9/2002 | Sato |
| 6,466,250 B1 | 10/2002 | Hein et al. |
| 6,466,275 B1 * | 10/2002 | Honey et al. ................ 348/722 |
| 6,483,511 B1 * | 11/2002 | Snyder ....................... 345/473 |
| 6,483,523 B1 | 11/2002 | Feng |
| 6,525,780 B1 | 2/2003 | Bruno et al. |
| 6,535,226 B1 | 3/2003 | Sorokin et al. |
| 6,545,705 B1 | 4/2003 | Sigel et al. |
| 6,571,012 B1 | 5/2003 | Pettigrew |
| 6,571,054 B1 | 5/2003 | Tonomura et al. |
| 6,593,936 B1 | 7/2003 | Huang et al. |
| 6,597,406 B2 | 7/2003 | Gloudemans et al. |
| 6,642,939 B1 | 11/2003 | Vallone et al. |
| 6,674,461 B1 | 1/2004 | Klapman |
| 6,681,395 B1 | 1/2004 | Nishi |
| 6,707,456 B1 | 3/2004 | Marrin et al. |
| 6,741,241 B1 | 5/2004 | Jaubert et al. |
| 6,771,272 B2 | 8/2004 | Deering |
| 6,778,085 B2 | 8/2004 | Faulkner et al. |
| 6,791,574 B2 | 9/2004 | Hoch |
| 6,850,250 B2 | 2/2005 | Hoch |
| 6,860,806 B2 | 3/2005 | Kojima et al. |
| 2001/0003715 A1 * | 6/2001 | Jutzi et al. .................... 463/40 |
| 2001/0012324 A1 | 8/2001 | Normile |
| 2001/0023202 A1 | 9/2001 | Okubo |
| 2002/0010928 A1 | 1/2002 | Sahota |
| 2002/0027617 A1 | 3/2002 | Jeffers et al. |
| 2002/0064764 A1 | 5/2002 | Fishman et al. |
| 2002/0069265 A1 | 6/2002 | Bountour et al. |
| 2002/0152462 A1 | 10/2002 | Hoch et al. |
| 2003/0038892 A1 | 2/2003 | Wang et al. |
| 2003/0169335 A1 | 9/2003 | Monroe |
| 2004/0107439 A1 | 6/2004 | Hassell et al. |

* cited by examiner

SYSTEM AND METHOD FOR TRANSITIONING BETWEEN REAL IMAGES AND VIRTUAL IMAGES

CROSS REFERENCE TO RELATED APPLICATIONS

The application claims relating from the U.S. provisional application entitled "Method and Apparatus for Mixed Reality Broadcast" filed on Aug. 10, 2001, with Ser. No. 60/311,477, which is herein incorporated by reference.

FIELD OF THE INVENTION

The invention relates generally to audio/visual content and more particularly to an apparatus and method for improved real and virtual images.

BACKGROUND OF THE INVENTION

In many applications, virtual reality is the simulation of a real environment. Utilizing virtual reality may be useful for television productions due to a desire for re-creating and replaying various scenes of live events.

Various popular products are available in the marketplace for creating virtual reality effects on personal computers. However, they are limited in creating virtual reality based on real events.

When creating a simulated environment associated with a real event, various physical data may be collected to increase the realism of the simulated environment. For example, a virtual simulation may model a real event such as auto racing. In order to create a virtual race track with virtual race cars, knowing the physical parameters associated with real race cars racing on a real race track may be helpful.

Typical television sport event coverage includes many video cameras covering different parts of the event. Some auto racing events have as many as 20 video cameras covering the race track and are capable of providing a viewpoint from many different directions.

To produce a television program of a live event such as auto racing, a large amount of manual input is typically required to create a television program displaying real scenes captured by one of the real cameras and virtual scenes rendered by a processor.

SUMMARY OF THE INVENTION

The invention illustrates a system and method of blending a virtual scene and a real scene comprising: capturing a real image of a real event from a real camera; receiving an instrumentation data based on the real event; and rendering a virtual image wherein the virtual image is based on the instrumentation data and the real image.

Other aspects and advantages of the invention will become apparent from the following detailed description, taken in conjunction with the accompanying drawings, illustrated by way of example of the principles of the invention.

DETAILED DESCRIPTION

Specific reference is made in detail to the embodiments of the invention, examples of which are illustrated in the accompanying drawings. While the invention is described in conjunction with the embodiments, it will be understood that the embodiments are not intended to limit the scope of the invention. The various embodiments are intended to illustrate the invention in different applications. Further, specific details are set forth in the embodiments for exemplary purposes and are not intended to limit the scope of the invention. In other instances, well-known methods, procedures, and components have not been described in detail as not to unnecessarily obscure aspects of the invention.

The invention includes a system and method for generating a virtual mode viewing environment. The invention utilizes techniques for seamlessly transitioning between a virtual image and a real image in response to the instrumentation data gathered by video cameras and/or sensors. For the sake of simplicity and clarity, the invention is described with MPEG-2 being chosen as the delivery mechanism However, any delivery mechanism suitable for use with the invention may be utilized.

Figure 1:
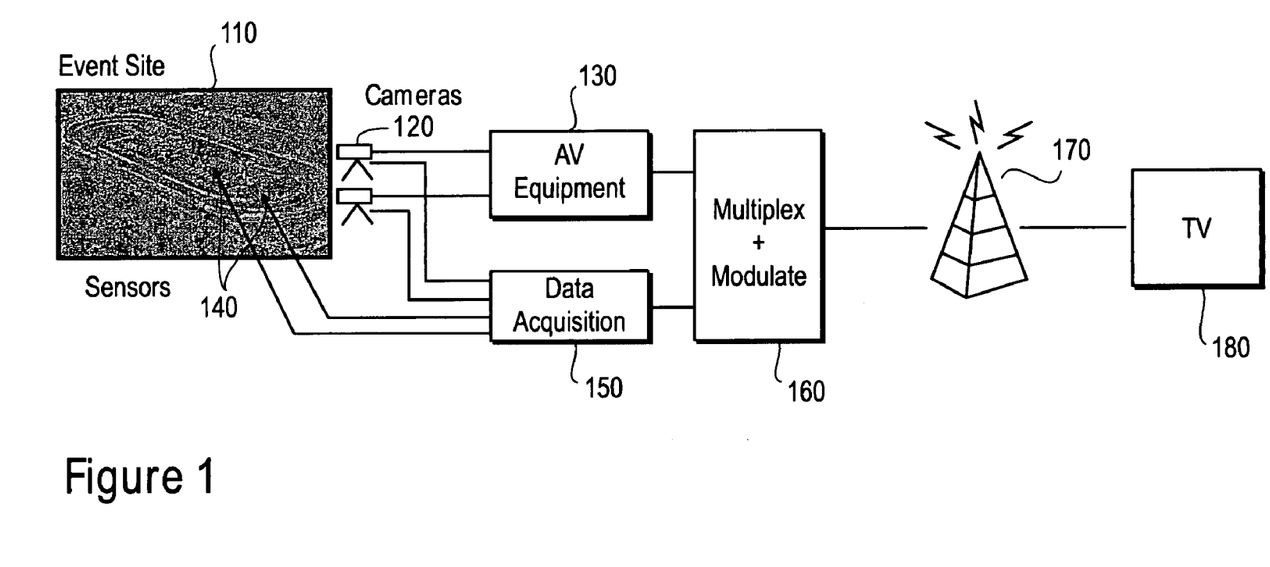
FIG. 1 illustrates one embodiment of a system overview according to the invention.

FIG. 1 illustrates a schematic diagram of one embodiment of a data acquisition and transmission system for use with a digital television system. In this illustrated example, an event occurs at an event site 110. In one embodiment, the event at the event site 110 is an auto racing event. However, any live event such as a sports event, a concert, a theatrical event, and the like may be utilized.

A plurality of cameras 120 is utilized to capture visual and audio signals of the event at the event site 110. In addition, the plurality of cameras 120 also captures camera instrumentation data concurrently with the visual and audio signals. Camera instrumentation data may include, for each video frame, the camera location, tilt, zoom, pan, field of view, focus setting, iris setting, and other information related to the optics of each of the plurality of cameras 120.

A plurality of sensors 140 are utilized within the event site 110 to capture performance instrumentation data. The performance instrumentation data describes the real event at the event site 110. The plurality of sensors 140 may capture the performance instrumentation data concurrently with the data camera instrumentation data captured by the plurality of cameras 120. In this example of a car racing event, each racecar may utilize a global positioning satellite unit as one of the plurality of sensors 140 to provide the performance instrumentation data in the form of the position related to the racecar. In another embodiment, one of the plurality of sensors 140 may include force sensor within each racecar provide the performance instrumentation data in the form of the force exerted on the racecar. These specific examples of the plurality of sensors 140 are shown for exemplary purposes only. Any type of sensor used to measure a physical aspect of the event at the event site 110 may be utilized.

An audio/visual equipment module 130 is configured to process the audio visual signals. In one embodiment, the audio/visual equipment module 130 is configured to receive the audio/visual signals from the plurality of cameras 120.

A data acquisition module 150 is configured to process instrumentation data. In one embodiment, the data acquisition module 150 is configured to receive the camera instrumentation data from the plurality of cameras 120 and the performance instrumentation data from the plurality of sensors 140. Thus, the performance data collected in the data acquisition module 150 includes both the camera instrumentation data which relates to particular parameters associated with the plurality of cameras 120 while recording the event and the performance instrumentation data which relates to data captured by the plurality of sensors 140 which describes aspects of the event.

The multiplex and modulate module 160 is configured to receive the audio visual signals from the audio visual equipment module 130 and the instrumentation data from the data acquisition module 150. In one embodiment, the module 160 is configured to multiplex and modulate the audio visual signals with the instrumentation data into a unified signal relative to time. A transmitter module 170 is configured to receive the unified signal from the multiplex and modulate module 160 and to transmit this unified signal. A television 180a shown as an exemplary device to receive the unified signal via the transmitter module 170.

Figure 2:
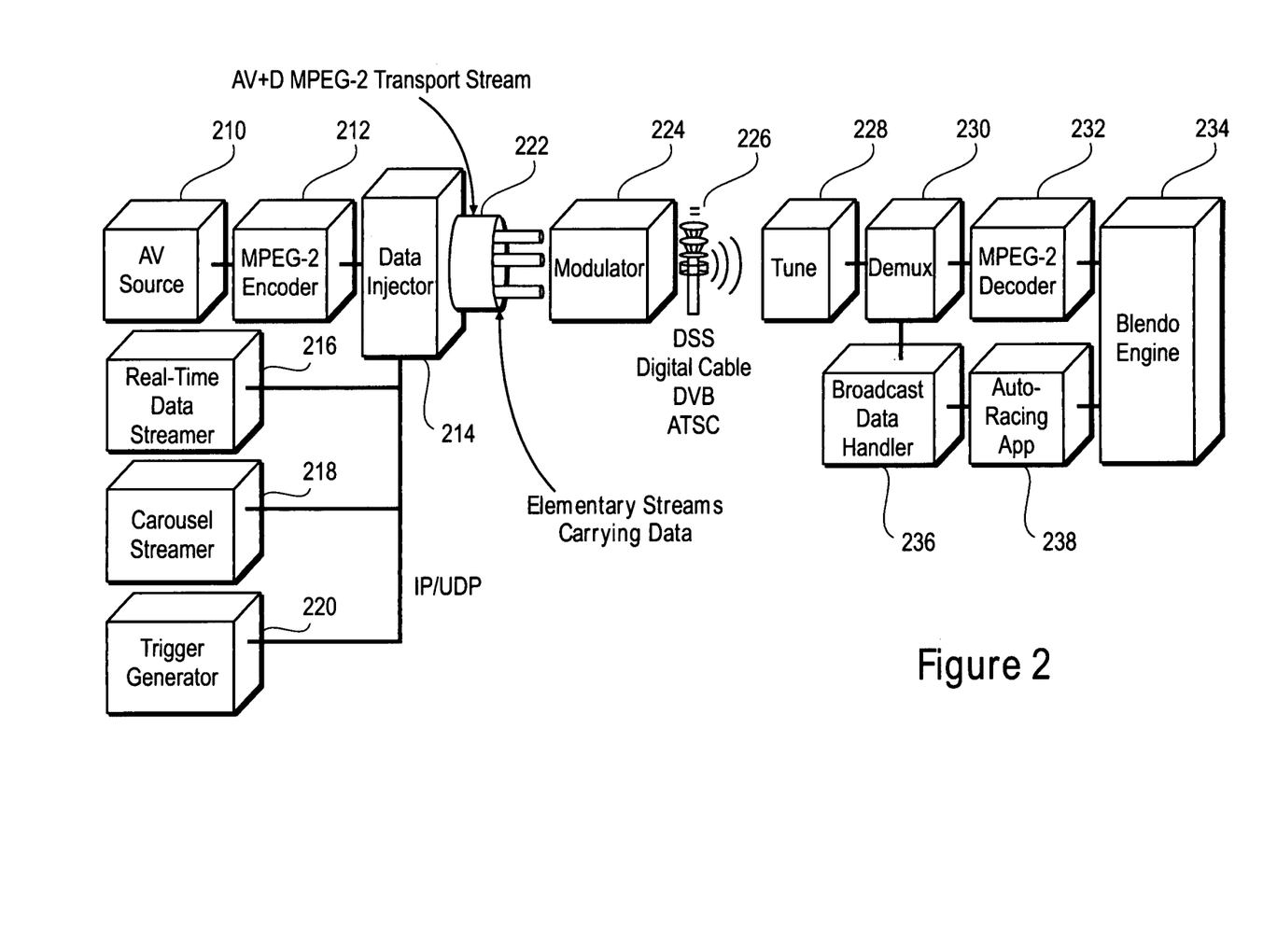
FIG. 2 illustrates one embodiment of a system overview according to the invention.

With reference to FIG. 2, a system 200 is shown for acquiring and processing both audio and video signals of an event and corresponding instrumentation data which describes physical parameters of the event according to one embodiment of the invention. In one example within the context of auto racing, the instrumentation data may include car speed, engine performance, physical location of the car, forces applied to the car, and the like. In other embodiments, the instrumentation data will vary with the specific application of the invention.

The instrumentation data corresponds with the audio and video signals in real time; the instrumentation data and the audio and video signals are temporally correlated. In one embodiment, they are temporally correlated by the use of timestamps. In another embodiment, they may be temporally correlated by relative signal timing.

In one embodiment, the system 200 includes an audio/visual (A/V) source 210, an MPEG-2 encoder 212, a data injector 214, a real-time data streamer 216, a carousel streamer 218, a trigger generator 220, an A/V and data transport stream 222, a modulator 224, a transmitter 226, a tuner 228, a demultiplexer 230, an MPEG-2 decoder 232, a presentation engine 234, a broadcast data handler 236, and an application module 238. Additional specific elements common in computer system such as processors, memory, user interfaces, system busses, storage devices, and the like are not shown to prevent unnecessary obscuring the aspects of the invention.

The components 210–238 are merely illustrated in FIG. 2 as one embodiment of the system 200. Although the components 210–238 are illustrated in FIG. 2 as separate components of the system 200, two or more of these components may be integrated, thus decreasing the number of components in the system 200. Similarly, the components 210–238 may also be separated, thus increasing the number of components within the system 200. Further, the components 210–238 may be implemented in any combination of hardware, firmware and software.

The A/V source 210 is connected to the MPEG-2 encoder 212 and provides the MPEG-2 encoder with A/V content. In one embodiment, the A/V source 210 includes a video camera. However, in another embodiment, the A/V source 210 may also include a video cassette recorder, a digital recorder, or other means for providing A/V content. The MPEG-2 encoder 212 receives the AN content and encodes this content to form an encoded A/V data stream according the MPEG-2 standard which is well known in the art. In other embodiments, other A/V encoders such as MPEG-1 or MPEG-4 may be utilized.

The MPEG-2 encoder 212, the real-time data streamer 216, the carousel streamer 218 and the trigger generator 220 are connected to the data injector 214. The real-time data streamer 216 provides the data injector 214 with instrumentation data which describes and corresponds in real-time with the A/V content from the A/V source 110. Instrumentation data describes in real-time physical aspects or conditions that correspond with the A/V content.

The carousel streamer 218 provides the data injector 214 with assets (e.g., images, audio clips, text files) related to the user interface. The trigger generator 220 provides the data injector 214 with data used to activate predefined actions on the receiver (e.g., authored questions for a trivia game or poll, advertisement names for pop-up ad inserts).

The data injector 214 receives incoming data from the MPEG-2 encoder 212, the real-time data streamer 216, the carousel streamer 218, and the trigger generator 220. The data injector 214 synchronizes the incoming data such that the data from the real-time data streamer 216, carousel streamer 218, and trigger generator 220 are timed with the corresponding encoded A/V data stream. The data injector 214 is connected to the A/V and data transport stream 222 and feeds the synchronized data through the A/V and data transport stream 222 to the modulator 224.

The modulator 224 receives the synchronized data. The synchronized data includes the encoded A/V data stream and associated instrumentation data from the real-time data streamer 216, carousel streamer 218, and trigger generator 220. The modulator 224 broadcasts this synchronized data through the transmitter 226. The transmitter 226 may broadcast through air, cable, phone lines, and the like.

The tuner 228 receives the synchronized data which is broadcast through the transmitter 226. The demultiplexer 230 is connected to the tuner 228 and receives the synchronized data from the tuner 228. The demultiplexer 230 separates the encoded A/V data stream from other data originally from the real-time data streamer 216, carousel streamer 218, and trigger generator 220. The MPEG-2 decoder 232 is connected to the demultiplexer 230 and receives the encoded A/V data stream from the demultiplexer 230. The broadcast data handler 236 is connected to the demultiplexer. The data from the real-time data streamer 216, carousel streamer 218, and trigger generator 220, is received by the broadcast data handler 236 from the demultiplexer 230.

The MPEG-2 decoder processes the encoded A/V data stream and returns a decoded A/V data stream which is either identical or nearly identical to the original A/V data stream from the A/V source 210. Similar to the MPEG-2 encoder 212, the MPEG-2 decoder 232 may be substituted with other A/V encoders such as MPEG-1 or MPEG-4. The MPEG-2 decoder 232 is connected with the presentation engine 234. The presentation engine 234 receives the decoded A/V data stream from the MPEG-2 decoder 232.

The broadcast data handler 236 is connected to the application module 138. The broadcast data handler 236 reformats the data from the transport stream into data that the application module 238 can utilize. The data from the real-time data streamer 216, carousel streamer 218, and trigger generator 220 is received by the application module 238. The application module 238 utilizes the data from the real-time data streamer 216, carousel streamer 218, and trigger generator 220. The application module 238 also interacts with the presentation engine 234.

Figure 3:
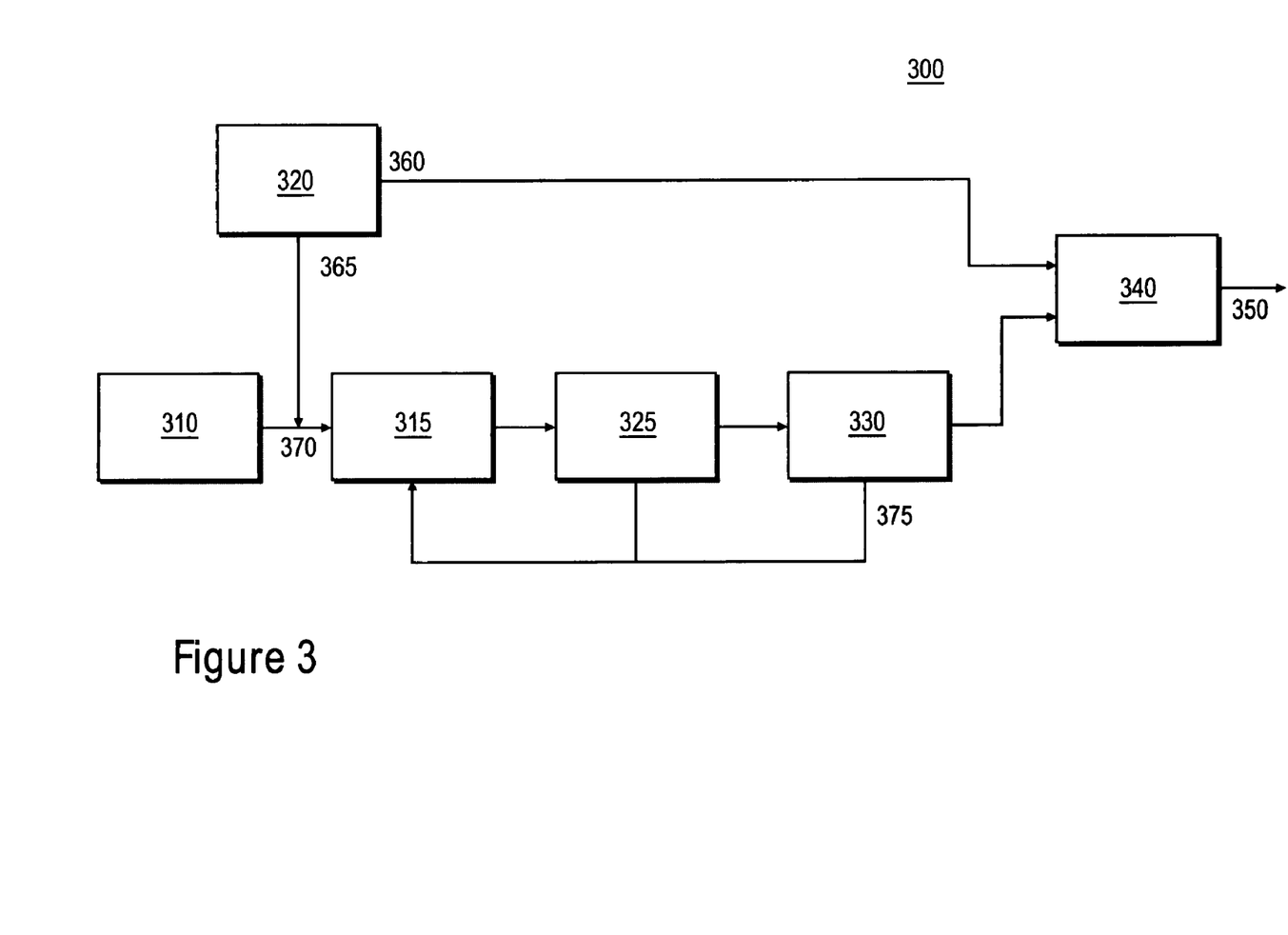
FIG. 3 illustrates an exemplary block diagram of the blending system according to the invention.

With reference to FIG. 3, a system 300 is shown for acquiring and processing both audio and video signals of an event and corresponding instrumentation data which describes physical parameters of the event and camera parameters according to one embodiment of the invention. The system 300 includes a sensor 310, a world model module 315, a camera 320, a user interface module 325, a rendering module 330, and a compositing module 340.

The components 310–340 are merely illustrated in FIG. 3 as one embodiment of the system 300. Although the components 310–340 are illustrated in FIG. 3 as separate components of the system 300, two or more of these components may be integrated, thus decreasing the number of components in the system 300. Similarly, the components 310–340 may also be separated, thus increasing the number of components within the system 300. Further, the components 310–340 may be implemented in any combination of hardware, firmware and software.

In one embodiment, the sensor 310 and the camera 320 are configured on the broadcast side and the rendering module 330 and the compositing module 340 are configured to be placed on the receiver side. However, in other embodiments, the rendering module 330 and the compositing module 340 are configured to be placed on the broadcast side.

In one embodiment, the camera 320 is configured to capture both image data 360 and camera instrumentation data 365. The image data 360 is sent the compositing module 340. The camera instrumentation data 365 is sent to the rendering module 330. The camera instrumentation data 365 may include field-of-view data, camera position data, zoom data, and pan data of the event being captured by the camera 320. There may also be multiple cameras within the system 300 wherein each camera is uniquely identified.

The sensor 310 is configured to capture performance instrumentation data 370 for use by the rendering module 330. In one embodiment, an auto racing event is utilized to demonstrate various performance instrumentation data 370 within the system 300. In other embodiments, the system 300 may be applied to other events. For example, the performance instrumentation data 370 may include car speed, car engine performance parameters, forces exerted onto the car, car position, and the like. Multiple sensors may be utilized within the system 300.

The world model module 315 receives the camera instrumentation data 365 and the performance instrumentation data 370. The world model module 315 is configured to track the locations of objects and cameras within the real event. In one embodiment, the world model module 315 is a scene graph representation of the real event. Within the scene graph representation, the world model module 315 stores both static nodes and dynamic nodes. The static nodes are objects and/or features within the virtual image that represent the real event which do not change over the course of the event. For example, a race track for an auto racing application may be represented by a static node. The dynamic nodes are objects and/or features within the virtual image which may change over the course of the real event. For example, a race car for an auto racing application may be represented by a dynamic node. The camera instrumentation data 365 and the performance instrumentation data 370 serve to update the world model module 315.

The user interface module 325 is configured to receive input from a user. The user interface module 325 modifies the world model module 315 based on the input from the user. For example, the user may add additional objects that are tracked by the world model module 315. These modifications are subsequently transmitted to the world model module 315.

The rendering module 330 receives the camera instrumentation data 365 and the performance instrumentation data 370. In one embodiment, the rendering module 330 generates a virtual image based on the camera instrumentation data 365. In another embodiment, the rendering module 330 generates a virtual image based on the performance instrumentation data 370. In yet another embodiment, the rendering module 330 generates a virtual image based on the camera instrumentation data 365 and the performance instrumentation data 370.

The rendering module 330 also transmits parameters associated with the virtual camera to the world model module 315. The notion of the virtual camera is to represent the viewpoint that a real camera would have if a real camera were to capture the virtual image which is rendered by the rendering module 330.

In one embodiment, the rendering module 330 is configured to generate a virtual image that incorporates the inclusion of the image data 360 from the camera 320. Additional examples of the inclusion of the image data 360 within the virtual image are illustrated in the following figures.

The compositing module 340 receives the virtual image from the rendering module 330 and the image data 360 from the camera 320. In one embodiment, the compositing module 340 integrates the image data 360 within the virtual image. In other words, the compositing module 340 blends the image data 360 within the virtual image to create a single, combined virtual image wherein the combined virtual image includes the virtual image from the rendering module 330 combined with the image data 360 which depicts a real event captured by the camera 320.

For the sake of clarity, the embodiment shown in the system 300 is illustrated utilizing the virtual image created by the rendering module 330 and image data representing a single real image captured by the camera 320. In another embodiment, multiple virtual images and image data representing multiple real images may be utilized to create a stream of images representing a video stream. Further, this stream of images both virtual and real may be combined by the compositing module 340.

Auto racing has been utilized as an example within various embodiments of the invention. However, any type of live event is suitable as application for use with the invention. For example, in a televised football game, the static portions of the world model include the football field and surrounding stadium. The dynamic objects include the football players and the ball. If the instrumentation data includes tracking the position of the football players, then the football player positions may be tracked using a technique such as inverse kinematics in one embodiment. If the instrumentation data includes tracking the particular motions of the football players, then the football player motions may be tracked using a technique such as joint position and/or orientation in one embodiment.

The world model module 315, the user interface module 325, and the rendering module 330 operate to effectively transition a virtual image rendered by the rendering module 325 into a real image captured by the camera 320 and vice-versa. For example, the world model module 330 is constantly being updated by incoming instrumentation data.

This updating may include parameters such as camera positions, camera zooms, object positions, object deformation, object rotation, and the like. Additional parameters may be utilized. In one embodiment, the world model module 315 also tracks the parameters associated with a virtual camera. The virtual camera represents the view for the virtual image.

Figure 4:
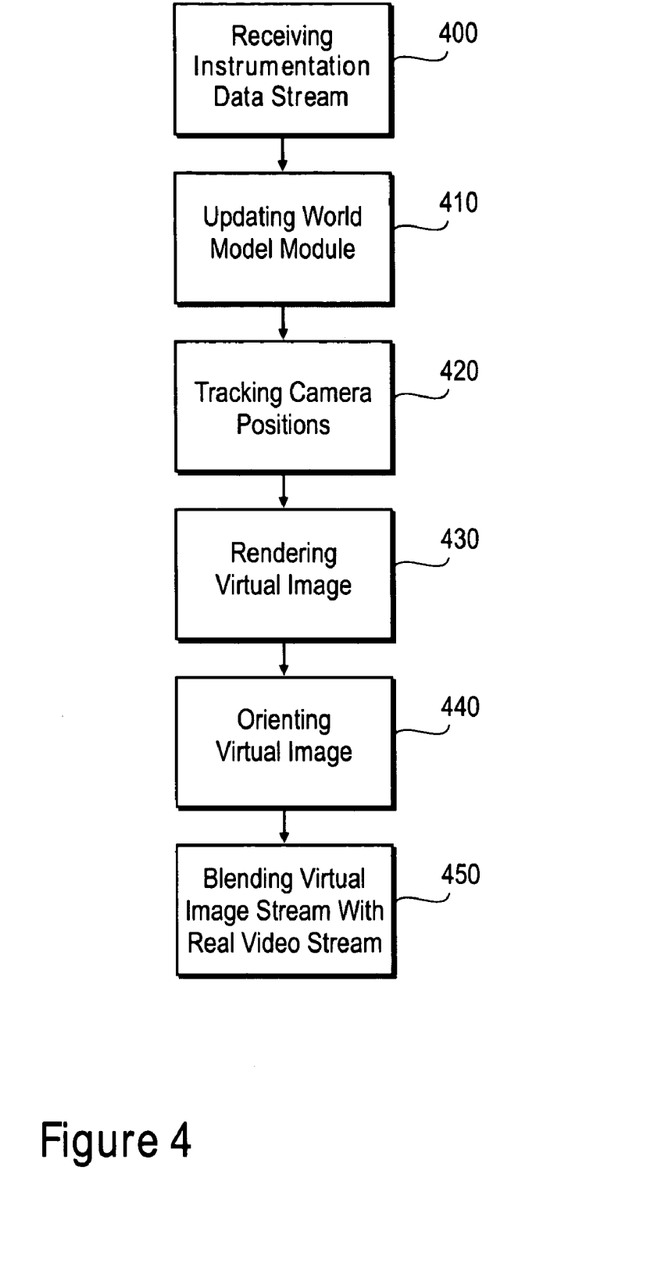
FIG. 4 illustrates an exemplary process flow diagram according to the invention.
Figure 5:
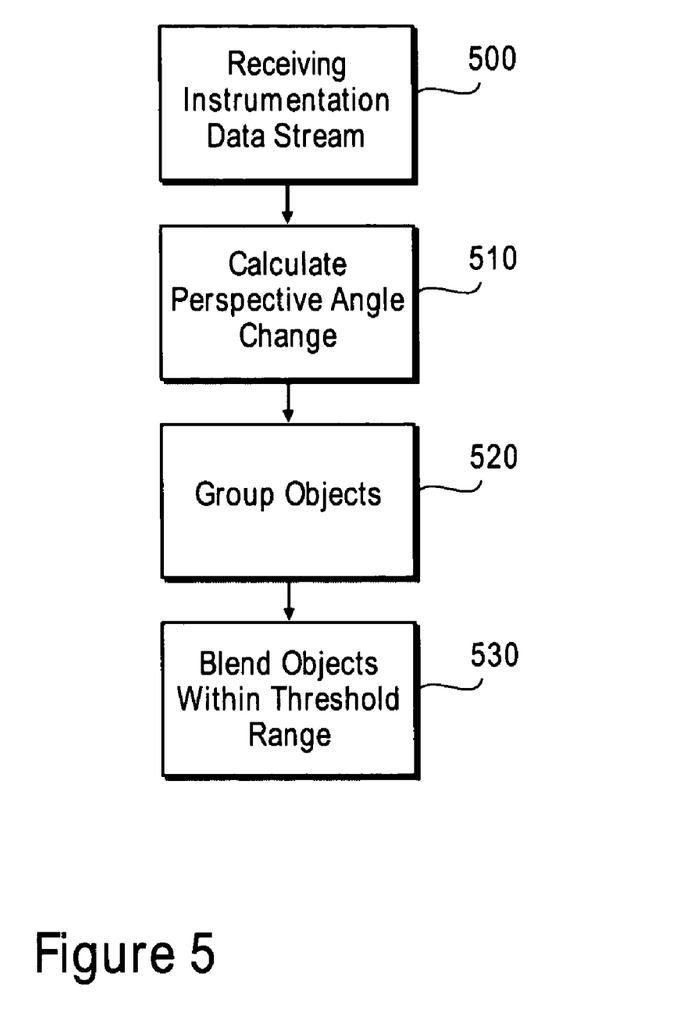
FIG. 5 illustrates an exemplary process flow diagram according to the invention.

The flow diagrams as depicted in FIGS. 4 and 5 are merely one embodiment of the invention. In this embodiment, the flow diagrams illustrate the use of the instrumentation data within the system 300 (FIG. 3).

The blocks within the flow diagram may be performed in a different sequence without departing from the spirit of the invention. Further, blocks may be deleted, added or combined without departing from the spirit of the invention.

In Block 400, the instrumentation data is received by the world model module 315 (FIG. 3). The instrumentation data may include both camera instrumentation data and performance instrumentation data.

In Block 410, the world model module 315 is updated with current instrumentation data.

In Block 420, the camera positions are tracked. Parameters such as camera position, camera zoom, camera pan, and camera field-of-view for the virtual camera and the real camera are tracked.

In one embodiment, a camera path between the desired camera location and the current camera location is calculated using the instrumentation data. The current camera location would correspond with the real camera in a real image to virtual image transition. Similarly, the current camera position would correspond with the virtual camera position in a virtual image to real image transition.

In one embodiment, the virtual camera position in a real image to virtual image transition may be determined by a user input which direct the virtual camera to a predetermined position.

In one embodiment, each real camera covering an event may also have a corresponding virtual camera whose viewpoint corresponds to the viewpoint of the real camera. The viewpoint of a camera depends on parameters such as pan, zoom, tilt, field-of-view, and the like.

In another embodiment, there may be virtual cameras which do not directly correspond with the viewpoint of a real camera. In such a case, the rendering module 330 may re-create a virtual image which corresponds to a real image.

In Block 430, the rendering module 330 generates a virtual image. Multiple virtual images represents a virtual video data stream. The virtual scene data stream represents a virtual video stream which is comprised of a series of virtual images. In one embodiment, the virtual scene data stream is generated in response to the instrumentation data. In another embodiment, the virtual scene data stream is generated in response to meta-tag labels associated with the instrumentation data. In yet another embodiment, the virtual scene data stream is generated in response to the real images associated with the instrumentation data.

The rendering module 330 creates the virtual image according to the viewpoint of the virtual camera and/or the real camera. In one embodiment, the viewpoints for the virtual camera and the real camera are coordinated. In another embodiment, the viewpoints for the virtual camera and the real camera do not correspond.

In one embodiment, the transition from either virtual image to real image or real image to virtual image occurs when the real camera and the virtual camera have a matched viewpoint. Depending on the type of transition, the rendering module 330 generates an image which has varying proportion between the virtual image and the real image depending on the instrumentation data which describes the viewpoints of the real camera and the virtual camera.

In Block 440, the rendering module 330 orients or positions the portion of the virtual image which is reserved for the real image. In one embodiment, the rendering module 330 utilizes the instrumentation data to position the portion of the virtual image which is reserved for the real image. In one embodiment, the real image is configured to be displayed on a plane surface within a virtual image. In this example, the location of the plan surface within the virtual image is dependent on the camera instrumentation such as field-of-view, camera location, zoom, and/or pan data. In another embodiment, the three dimensional orientation of the plane surface relative to the viewer is manipulated in response to the instrumentation data. In another embodiment, the real image is not restricted to being displayed on the plane surface and may be displayed on a variety of surfaces and/or contours.

In one embodiment, the rendering module 330 customizes the orientation of the image in response to the instrumentation data. In another embodiment, the rendering module 330 customizes the virtual image in response to the instrumentation data. In yet another embodiment, the rendering module 330 customizes both the virtual image and the orientation of the real image in response to the instrumentation data.

In one embodiment, the rendering module 330 prioritizes the order of rendering various objects within the virtual image and the real image based on blending techniques and the instrumentation data.

In Block 450, the compositing module 340 (FIG. 3) integrates and blends the virtual scene data stream and the real video stream in response to the rendering process shown for exemplary purposes within the rendering module 330.

The Blocks 400–450 are being performed within the context of the world model module 315, the user interface module 325, the rendering module 330 and the compositing module 340 for exemplary purposes only. In other embodiments, the Blocks 400–450 may be performed in any generalized processor or any graphics specific processor.

FIG. 5 illustrates a blending technique for use within the rendering module 330. In Block 500, the instrumentation data is received by the rendering module 330. The instrumentation data may include both camera instrumentation data and performance instrumentation data.

In Block 510, the perspective angle change for each tracked object is calculated. The perspective angle change corresponds to the angle of change relative to the line of sight. The closer the object is to the camera, the greater the perspective angle change would be for any given camera position.

In Block 520, the objects are grouped according to their perspective angle change.

In Block 530, the transition or blending process begins with the objects at a predetermined perspective angle change. In one embodiment, the objects with the largest perspective angle change are blended first. In another embodiment, the objects with the smallest perspective angle change are blended first.

Figure 6:
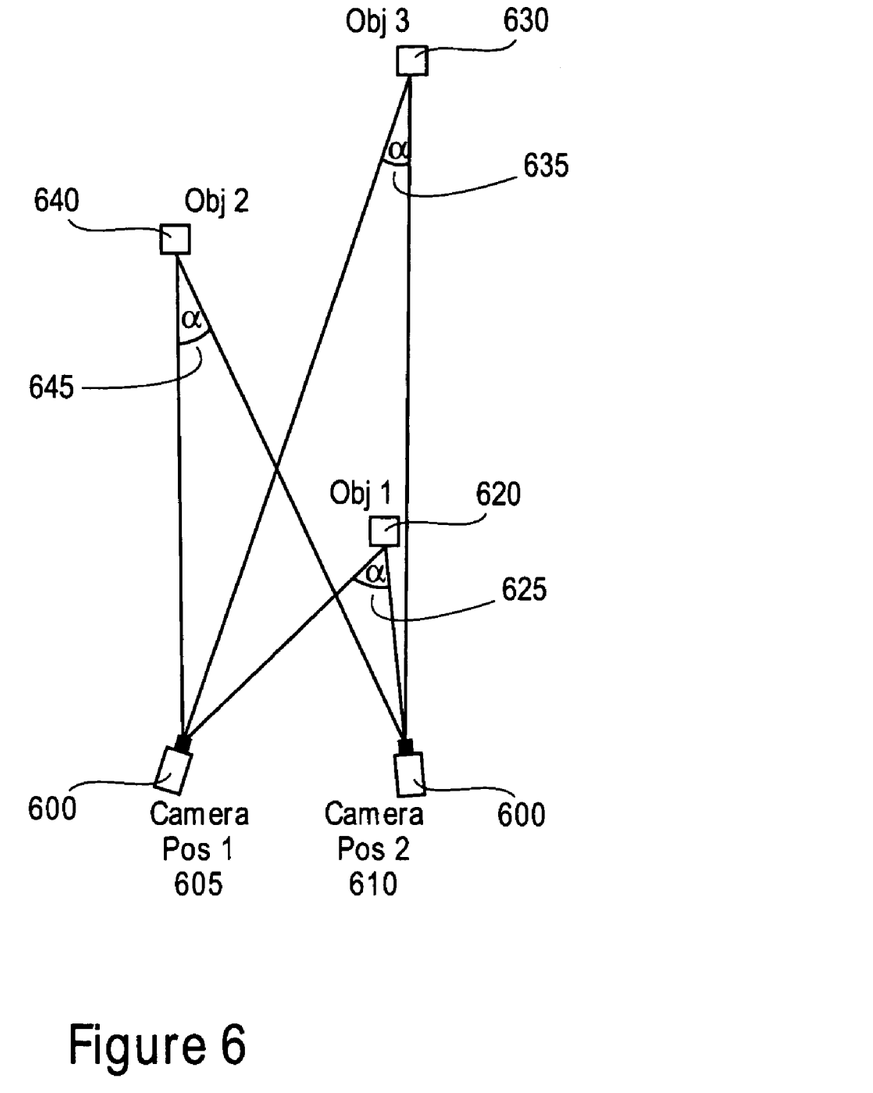
FIG. 6 illustrates an exemplary embodiment according to the invention.

FIG. 6 illustrates the effects of camera positions and perspective angle change. A camera 600 moves from a starting position 605 to a final position 610. As the camera 600 makes this move, an object 620 has a perspective angle change 625; an object 630 has a perspective angle change 635; and an object 640 has a perspective angle change 645.

The object 620 is closer to the camera 600 than the objects 630 and 640. Accordingly, the perspective angle change 625 is also the largest.

In another embodiment, an alternate blending technique may utilize content dependent blending. Utilizing content dependent blending, different parts of the scene are divided, grouped, and prioritized for blending. For example, the scene may be divided into a foreground and a background. In this example, a race car may be an object in the foreground and a race track and stadium may be an object in the background. In one embodiment, if the foreground is to be blended first, then the race car would have a higher priority to be blended. In addition, since the race track and stadium are grouped as the background, they would be blended next.

Figure 7:
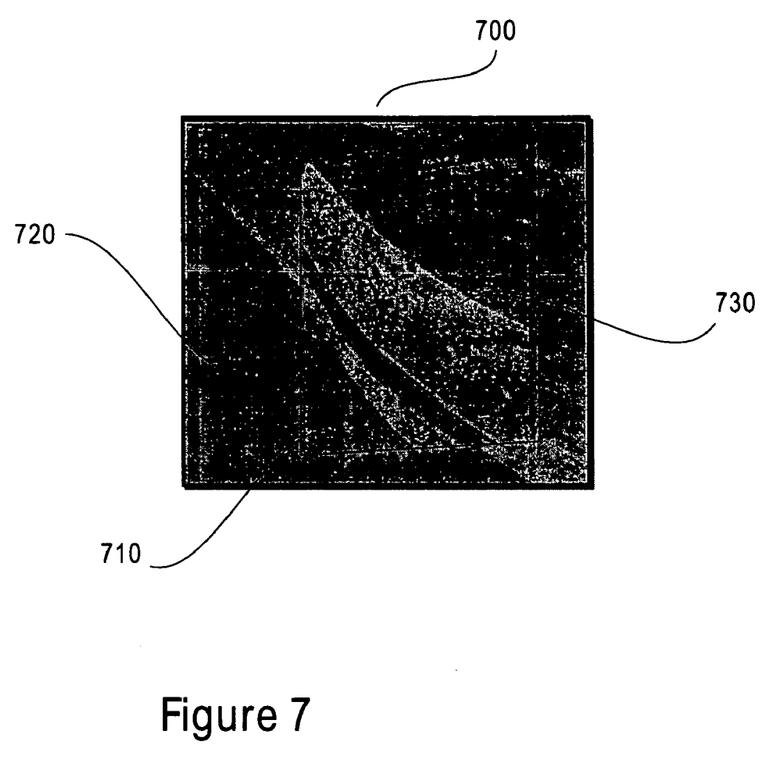
FIGS. 7–9 show an exemplary screen shot illustrating one embodiment according to the invention.
Figure 8:
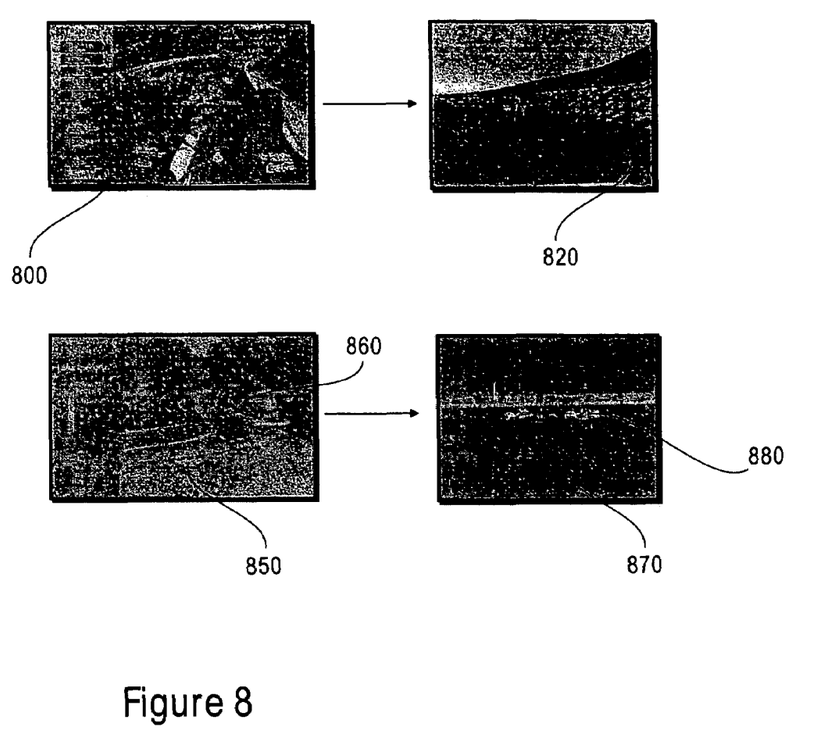
Figure 9:
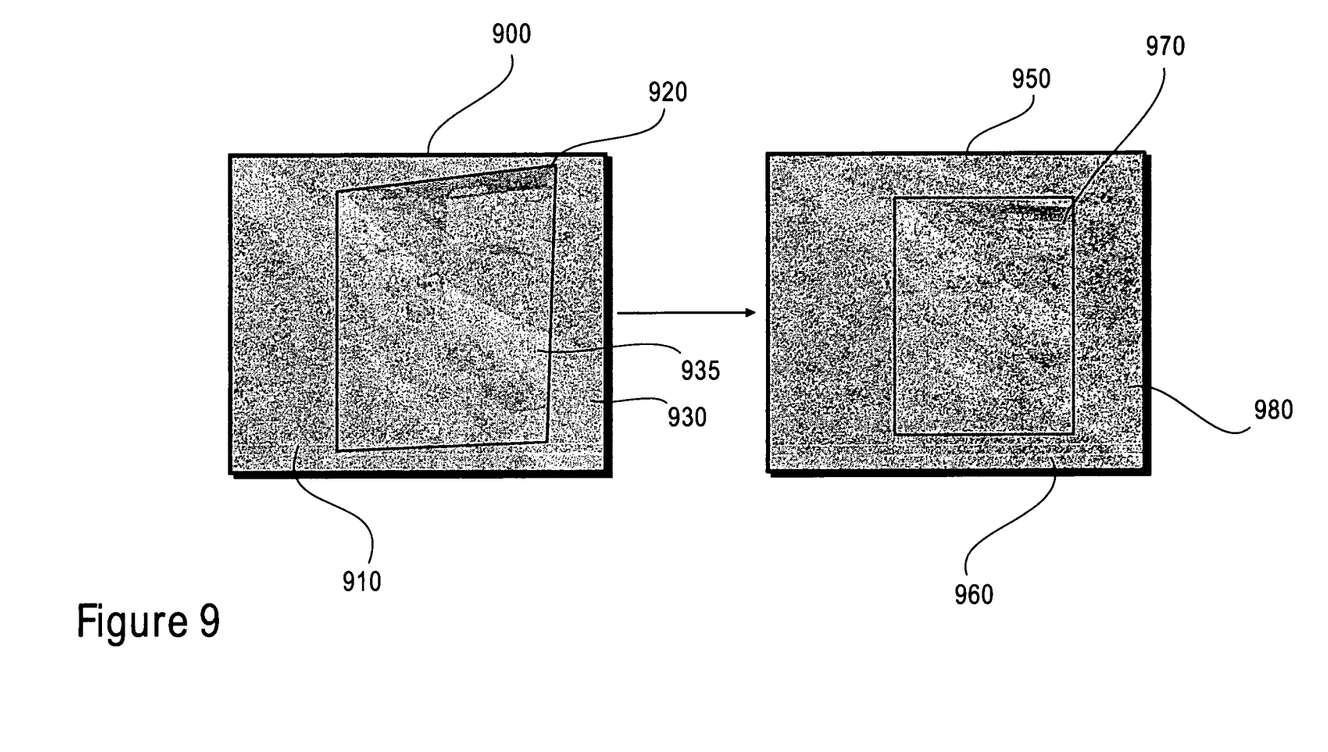

For the sake of clarity, FIGS. 7, 8, and 9 illustrate a particular screen shot for demonstrating one embodiment for the invention. Other embodiments may contain variations of the particular screen shots shown in FIGS. 7, 8, and 9 without departing from the spirit of the invention. In the screen shots, an auto racing application is utilized. However, any live event may be utilized in other embodiments.

FIG. 7 illustrates a screen shot 700. The screen shot 700 includes a virtual scene image 720 and a real scene image 710. Although possibly based on a real event, the virtual scene image 720 is a rendered image and is not captured from a live event. In one embodiment, the virtual scene image 720 is a single virtual image within a series of virtual images. Likewise, the real scene 710 is captured from a live event and is one real image within a series of real images.

The virtual scene image 720 includes a virtual race track 730. The real scene image 710 is displayed on a surface. In one embodiment, the surface of the real scene image 710 is displayed at a particular angle such that the real scene image 710 is presented to have a three dimensional quality even though the real video image as captured by a video source in two dimensions. In one embodiment, the angle of the real scene image 710 as displayed within the screen shot 700 is in response to the instrumentation data from the camera such as field-of-view and/or camera position.

In one embodiment, the real scene image 710 is positioned relative to the virtual race track 730 in response to the actual location of the real race cars and the location of an in-board camera affixed to each of the real race cars which are the subjects of the real scene image 710. The real scene image 710 may be positioned relative to the virtual race track 730 in response to the instrumentation data from the location of the race cars, the field-of-view by the camera, and/or the position of the camera.

In one embodiment, the virtual race track 730 may be appropriately sized relative to the real scene image 710 in response to the instrumentation data such as the zoom of the real camera. In another embodiment, the real scene image 710 may be appropriately sized relative to the virtual scene image 720 in response to the instrumentation data such as the zoom of the real camera.

The transition for both virtual scene to real scene and real scene to virtual scene are shown by aligning the real camera and the virtual camera. For example, in transitioning from virtual scene to real scene, the real camera may have different parameters from the virtual camera. In one embodiment, the virtual camera may be adjusted to align with the real camera. The virtual camera moves its parameters to be aligned with the real camera. The virtual camera may adjust the pan, tilt, zoom, position, and/or field of view.

FIG. 8 illustrates screen shots 800, 820, 850, and 870. The screen shot 800 is a real scene captured by a real camera. The screen shot 800 transitions to the screen shot 820. The screen shot 820 is a virtual scene which is rendered from the perspective of a virtual camera. Though intermediate scenes are not shown, the viewpoints of the real camera and the virtual camera were aligned prior to the transition from the real scene to the virtual scene. In one embodiment, the alignment of the virtual camera is accomplished through utilizing the instrumentation data.

The screen shot 850 is a real scene captured by the real camera. The screen shot 850 includes a plurality of real race cars 860. The screen shot 850 transitions to the screen shot 870. The screen shot 870 is a virtual scene which is rendered from the perspective of a virtual camera. The transition from the screen shot 850 to the screen shot 870 illustrates the different views which may be obtained with the virtual camera. The screen shot 870 also includes a plurality of virtual race cars 880. The plurality of virtual race cars 880 represent the plurality of real race cars 860. Even though the viewpoint of the plurality of virtual race cars 880 differs from the viewpoint of the plurality of real race cars 860, the plurality of virtual race cars 880 accurately reflects the relative positions of each of the plurality of real race cars 860. The screen shot 870 accurately renders the plurality of virtual race cars in part due to the use of the instrumentation data.

The screen shots 800, 820, 850, and 870 illustrate a transition from the real scene to the virtual scene. However, a transition from the virtual scene to the real scene can occur in other embodiments.

FIG. 9 illustrates screen shots 900 and 950. The screen shot 900 includes a virtual scene 910 which is rendered with a viewpoint of a virtual camera and a real scene 920 which is captured of a live event by a real camera. The real scene 920 is positioned within the virtual scene 910 having a perspective which reflects the viewpoint of the real camera. The real scene 920 may be positioned with this unique perspective based on the instrumentation data from the real camera. Further, a real race track 935 within the real scene 920 is aligned with a virtual race track 930 within the virtual scene 910 via the instrumentation data which is acquired by a sensor and/or the real camera.

The screen shot 900 transitions to the screen shot 950. The screen shot 950 includes a virtual scene 960 which corresponds with the virtual scene 910 and a real scene 970 which corresponds to the real scene 920. The virtual scene 960 is enlarged compared to the virtual scene 910 and the viewpoint of the virtual camera has changed which displays more of a virtual race track 980. The real scene 970 has grown smaller compared to the real scene 920. As the real scene 970 grows smaller, the screen shot 950 illustrates a transition from a real scene to a virtual scene.

The screen shots 900 and 950 illustrate a transition from the real scene to the virtual scene. However, a transition from the virtual scene to the real scene can occur in other embodiments.

The foregoing descriptions of specific embodiments of the invention have been presented for purposes of illustration and description. For example, the invention is described within the context of auto racing and football as merely embodiments of the invention. The invention may be applied to a variety of other theatrical, musical, game show, reality show, and sports productions.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising:
   a world model module that creates a world model associated with a real event, the world model comprising static and dynamic nodes, each static node associated with a static object in the real event and each dynamic node associated with a dynamic object in the real event;
   a rendering module that generates a virtual image at a virtual perspective, wherein rendering module generates the virtual image by using the world model and instrumentation data; and
   a compositing module that blends the virtual image and a real image of the real event into a resultant image, wherein, within the resultant image, a proportion between the virtual image and the real image varies in accordance with the instrumentation data to transition between the virtual image and the real image.

2. The system according to claim 1 wherein the instrumentation data includes one of a camera position, a camera zoom, a camera pan, a camera tile, a camera field-of-view, and an object location.

3. The system according to claim 1 wherein the rendering module further determines a blending priority for an object within the real image, wherein the blending priority is based on the instrumentation data.

4. The system according to claim 3 wherein the blending priority is based on a perspective angle change of the object.

5. The system according to claim 1 wherein the rendering module uses the instrumentation data to align the virtual image with a viewpoint of a real camera device.

6. The system according to claim 1 further comprising a sensor that generates the instrumentation data by measuring a physical parameter associated with the real event.

7. The system according to claim 6 wherein the physical parameter includes one of a force exerted on an object and a location of the object.

8. A method comprising:
   obtaining a world model associated with a real event, the world model comprising static and dynamic nodes, each static node associated with a static object in the real event and each dynamic node associated with a dynamic object in the real event;
   rendering a virtual image at a virtual perspective, wherein the virtual image is rendered by using the world model and instrumentation data from the real event; and
   blending the virtual image with a real image of the real event into a resultant image, wherein, within the resultant image, a proportion between the virtual image and the real image varies in accordance with the instrumentation data to transition between the virtual image and the real image.

9. The method according to claim 8 wherein the instrumentation data includes one of a camera position, a camera zoom, a camera pan, a camera tilt, a camera field-of-view, and an object location.

10. The method according to claim 8 further comprising tracking a parameter of a real camera via the instrumentation data.

11. The method according to claim 8 further comprising using the instrumentation data to align a viewpoint of a real camera with a viewpoint of the virtual image.

12. The method according to claim 8 further comprising using the instrumentation data to calculate a perspective angle change of an object within the real image.

13. The method according to claim 8 further comprising using the instrumentation data to position the real image relative to the virtual image.

14. A computer-readable medium having computer executable instructions for performing a method comprising;
   obtaining a world model associated with a real event, the world model comprising static and dynamic nodes, each static node associated with a static object in the real event and each dynamic node associated with a dynamic object in the real event;
   rendering a virtual image at a virtual perspective, wherein the virtual image is rendered by using the world model and instrumentation data from the real event; and
   blending the virtual image with a real image of the real event into a resultant image, wherein, within in the resultant image, a proportion between the virtual image and the real image varies in accordance with the instrumentation data to transition between the virtual image and the real image.

* * * * *